United States Patent
Pikus et al.

(10) Patent No.: US 11,743,535 B2
(45) Date of Patent: *Aug. 29, 2023

(54) VIDEO FRAGMENT FILE PROCESSING

(71) Applicant: Comcast Cable Communications, LLC, Philadelphia, PA (US)

(72) Inventors: Kevin L. Pikus, Colorado Springs, CO (US); Ryan McMurray, Philadelphia, PA (US); Yasser F. Syed, La Crescenta, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,290

(22) Filed: Jul. 20, 2022

(65) Prior Publication Data

US 2022/0394329 A1 Dec. 8, 2022

Related U.S. Application Data

(63) Continuation of application No. 17/100,532, filed on Nov. 20, 2020, now Pat. No. 11,432,038, which is a
(Continued)

(51) Int. Cl.
*H04N 21/4402* (2011.01)
*H04N 21/2343* (2011.01)
(Continued)

(52) U.S. Cl.
CPC ..... *H04N 21/4402* (2013.01); *H04N 21/2312* (2013.01); *H04N 21/2343* (2013.01);
(Continued)

(58) Field of Classification Search
CPC ........... H04N 21/4402; H04N 21/2312; H04N 21/23418; H04N 21/2343;
(Continued)

(56) References Cited

U.S. PATENT DOCUMENTS 5,930,493 A 7/1999 Ottesen et al.
7,075,990 B2 7/2006 Costa
(Continued)

FOREIGN PATENT DOCUMENTS

KR 20090059477 A 6/2009
WO 0247391 A1 6/2002
(Continued)

OTHER PUBLICATIONS

Stanley, Derek, "What bitrate should I use when encoding my video? How do I optimize my video for the web", [online], pp. 1-10, ezs3, Digital Marketing Limited, Doncaster, UK, <http://www.ezs3.com/public/What_bitrate_should_I_use_when_encoding_my_video_How_do_I_optimize_my_video_for_the_web.cfm>, Retrieved Dec. 9, 2016.
(Continued)

*Primary Examiner* — Robert J Hance
(74) *Attorney, Agent, or Firm* — Banner & Witcoff, Ltd.

(57) ABSTRACT

Methods and systems for packaging, transcoding, and fragmenting files (e.g., video content are described. Video content may be transcoded into fix size, variable duration fragments files that satisfy a target fragment file size. Those fragment files may be received, decoded to recover original frames of the underlying video, and then repackaged as new fragment files that are grouped based on overall file size. As a result, the new fragments may have different playback durations, but their overall file sizes may be the same and/or within a target fragment file size (TFS).

27 Claims, 8 Drawing Sheets

Related U.S. Application Data continuation of application No. 15/621,192, filed on Jun. 13, 2017, now Pat. No. 10,873,781.

(51) Int. Cl.
| | |
|---|---|
| *H04N 21/61* | (2011.01) |
| *H04N 21/234* | (2011.01) |
| *H04N 21/845* | (2011.01) |
| *H04N 21/24* | (2011.01) |
| *H04N 21/258* | (2011.01) |
| *H04N 21/2662* | (2011.01) |
| *H04N 21/2312* | (2011.01) |

(52) U.S. Cl.
CPC . *H04N 21/23418* (2013.01); *H04N 21/23439* (2013.01); *H04N 21/234309* (2013.01); *H04N 21/234363* (2013.01); *H04N 21/234381* (2013.01); *H04N 21/2402* (2013.01); *H04N 21/25825* (2013.01); *H04N 21/2662* (2013.01); *H04N 21/6175* (2013.01); *H04N 21/8456* (2013.01)

(58) Field of Classification Search
CPC ... H04N 21/234309; H04N 21/234363; H04N 21/234381; H04N 21/23439; H04N 21/2402; H04N 21/25825; H04N 21/2662; H04N 21/6175; H04N 21/8456
See application file for complete search history.

(56) References Cited

U.S. PATENT DOCUMENTS

| | | | |
|---|---|---|---|
| 7,320,069 B1 | 1/2008 | Sundharraj et al. | |
| 8,898,338 B1* | 11/2014 | McGowan | H04N 21/00 709/248 |
| 9,204,101 B1 | 12/2015 | Sharifi | |
| 9,288,510 B1* | 3/2016 | Yang | H04N 21/234309 |
| 9,681,197 B2 | 6/2017 | Panje et al. | |
| 9,973,785 B1 | 5/2018 | Yang et al. | |
| 10,313,419 B1* | 6/2019 | Waggoner | H04N 21/2187 |
| 2007/0274340 A1 | 11/2007 | Raveendran et al. | |
| 2008/0114889 A1 | 5/2008 | Deshpande | |
| 2009/0276543 A1 | 11/2009 | Turner et al. | |
| 2010/0146139 A1* | 6/2010 | Brockmann | H04N 19/40 709/236 |
| 2011/0119394 A1 | 5/2011 | Wang et al. | |
| 2012/0314761 A1 | 12/2012 | Melnyk et al. | |
| 2013/0051276 A1 | 2/2013 | Pantelias | |
| 2013/0156094 A1 | 6/2013 | Syed et al. | |
| 2013/0227122 A1 | 8/2013 | Gao et al. | |
| 2014/0025835 A1 | 1/2014 | Gahm et al. | |
| 2014/0185466 A1 | 7/2014 | Syed et al. | |
| 2014/0223196 A1 | 8/2014 | Ignomirello | |
| 2014/0321532 A1 | 10/2014 | Ghat et al. | |
| 2015/0020135 A1 | 1/2015 | Frusina et al. | |
| 2015/0082337 A1 | 3/2015 | Mamidwar et al. | |
| 2015/0143421 A1 | 5/2015 | Williams et al. | |
| 2015/0189222 A1* | 7/2015 | John | H04N 21/8456 348/441 |
| 2015/0237102 A1 | 8/2015 | Baccichet et al. | |
| 2015/0261600 A1* | 9/2015 | Iturralde | H04N 21/236 714/747 |
| 2015/0278247 A1 | 10/2015 | Tsurusawa | |
| 2015/0281746 A1 | 10/2015 | Lam | |
| 2015/0281752 A1 | 10/2015 | Van Veldhuisen | |
| 2016/0035389 A1 | 2/2016 | Boic | |
| 2016/0065995 A1* | 3/2016 | Phillips | H04N 21/25841 725/62 |
| 2016/0072637 A1 | 3/2016 | Gholmieh et al. | |
| 2016/0191961 A1 | 6/2016 | Fisher et al. | |
| 2016/0212483 A1 | 7/2016 | Ansley | |
| 2016/0295250 A1 | 10/2016 | Yang et al. | |
| 2017/0055012 A1 | 2/2017 | Phillips et al. | |
| 2017/0111670 A1 | 4/2017 | Ducloux et al. | |
| 2017/0127121 A1 | 5/2017 | Lingley et al. | |
| 2017/0359601 A1 | 12/2017 | Sievers et al. | |
| 2018/0359301 A1* | 12/2018 | Zhao | H04L 67/564 |
| 2019/0289311 A1 | 9/2019 | Xiang et al. | |

FOREIGN PATENT DOCUMENTS

| | | |
|---|---|---|
| WO | 2015153234 A1 | 10/2015 |
| WO | 2015190893 A1 | 12/2015 |

OTHER PUBLICATIONS

"Elementary Stream", [online], Wikipedia, (Last Updated Jul. 29, 2016), pp. 1-3, <https://en.wikipedia.org/wiki/Elementary_stream>, Retrieved Dec. 9, 2016.

"Group of Pictures", [online], Wikipedia, (Last Updated Jul. 24, 2017), pp. 1-2, <https://en.wikipedia.org/wiki/Group_of_pictures>, Retrieved Dec. 9, 2016.

Aug. 21, 2018—Extended European Search Report—EP 18177500.8.

Oct. 16, 2019—European Office Action—EP 18177500.8.

Jul. 27, 2020—European Office Action—EP 18177500.8.

* cited by examiner

VIDEO FRAGMENT FILE PROCESSING

CROSS-REFERENCE TO RELATED APPLICATIONS

This application is a continuation of U.S. application Ser. No. 17/100,532, filed Nov. 20, 2022, which is a continuation of U.S. application Ser. No. 15/621,192, filed Jun. 13, 2017 and now U.S. Pat. No. 10,873,781, each of which is hereby incorporated by reference in its entirety.

BACKGROUND

Delivery of video content is typically done in fragment files, each containing the audio and video for some small portion of the video content. Fragment files typically have a fixed duration in time or contain a fixed number of frames. Fixing a time duration or a frame count of the fragment files may result in large variations in fragment file sizes. There remains an ever-present need to handle such fragment files in a way that minimizes variations in fragment file sizes.

SUMMARY

The following summary is for illustrative purposes only, and is not intended to limit or constrain the detailed description. The following summary merely presents various described aspects in a simplified form as a prelude to the more detailed description provided below.

Pictures in incoming video content may be received and then regrouped as differently-formatted video fragment files. The incoming video content may comprise incoming video fragments. The differently-formatted video fragment files may be assembled to try and keep to a more uniform file size (e.g., 500 kB).

The incoming video content may be received by a computing device, and then the original frames of the video content may be reconstituted. Then, the original frames may be regrouped based on a target fragment file size. The target fragment file size may be determined based on video characteristics of the video content and/or available bandwidth. In this regrouping, the computing device may process the incoming video content sequentially. For any incoming video file, the computing device can decode the video to recover the video frames, and then determine how many of those video frames will fit in the target fragment file size. Any remainder frames may be held over for the next outgoing video fragment. If the computing device processes further incoming video frames, the computing device may first start with the held over/remaining frames from the incoming video, and then the computing device may determine how many additional frames from the incoming video can be added to the next outgoing video fragment until the target fragment file size is reached. Those frames (the held over/remaining frames and the additional selected frames from the previous/first video fragment) may be encoded into a new outgoing video fragment file, and any held over/remaining frames from the source video may be retained for inclusion into the next sequential outgoing video fragment. This process may then continue sequentially processing incoming video until the end of the video content is reached.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and is not limited by, the accompanying figures in which like numerals indicate similar elements.

DETAILED DESCRIPTION

In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure. In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure.

Figure 1:
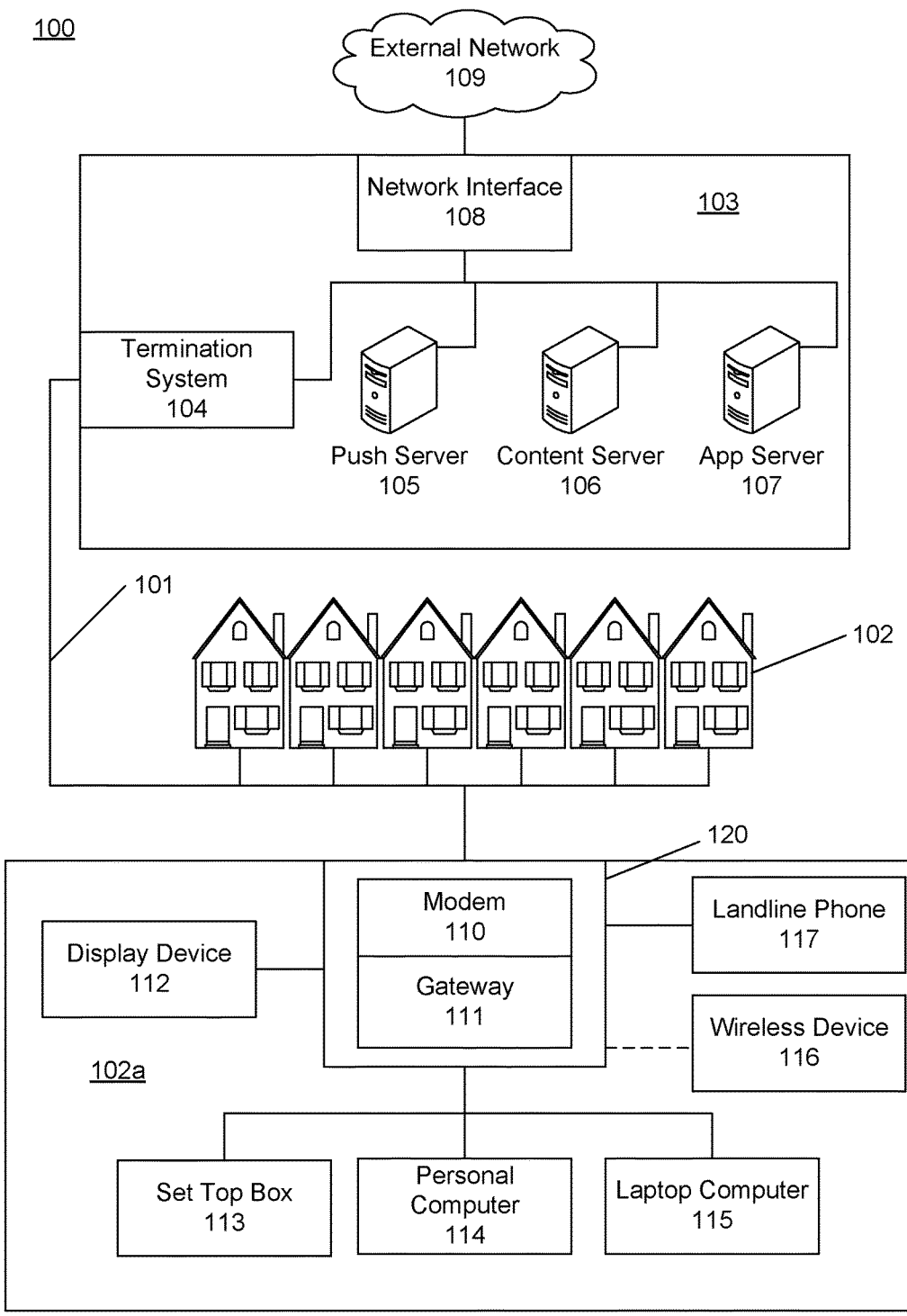
FIG. 1 shows an example communication network on which many of the various features described herein may be implemented.

FIG. 1 shows an example communication network 100 on which many of the various features described herein may be implemented. The network 100 may be any type of information distribution network, such as satellite, telephone, cellular, wireless, etc. The network 100 may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101 and the premises 102 may have receivers used to receive and to process those signals.

There may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of the links 101 and backend devices such as servers 105-07. The interface 104 may be as specified in a standard, such as the Data Over Cable Service Interface Specification (DOCSIS) standard, published by Cable Television Laboratories, Inc. (a.k.a CableLabs), or it may be a similar or modified interface. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. These networks 109 may transmit content to the local office 103 via a plurality of variable size, fixed duration video fragments. The network interface 108 may include the corresponding circuitry needed to communicate on the external networks 109, and to other devices on the network such as a cellular telephone network and its corresponding cell phones.

As noted above, the local office 103 may include a variety of servers 105-07 that may be configured to perform various functions. The local office 103 may include a push notification server 105. The push notification server 105 may generate push notifications to deliver data or commands to the various premises 102 in the network or to the devices in the premises 102 that are configured to detect such notifications. The local office 103 may also include one or more content servers 106. The content servers 106 may be one or more computing devices that are configured to provide content to users at their premises. This content may be, for example, video content such as video on demand movies or television programs, songs, text listings, or other types of content. The content server 106 may include software to validate user identities and entitlements, to locate, retrieve and receive requested content, to encrypt the content, and to initiate delivery by streaming of the content to the requesting user or device. The content may comprise a plurality of fixed size, variable duration video fragments. The local office 103 may include a load balancer (not illustrated) to route service requests to one of the content servers 106. The load balancer might route the service requests based on utilization or availability of each of the content servers 106.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Redhat, HTML5, JavaScript, AJAX, or COMET. The application server 107 may be responsible for collecting television program listings information and generating a data download for electronic program guide listings. In some aspects of the disclosure, the application server 107 may be responsible for monitoring user viewing habits and collecting that information for use in selecting advertisements. The application server 107 may be responsible for formatting and inserting advertisements in a video stream being transmitted to the premises 102. Although shown separately, one of ordinary skill in the art will appreciate that the push server 105, the content server 106 and the application server 107, may be combined. Further, here the push server 105, content server 106, and the application server 107 are shown generally, and it will be understood that they may each contain memory storing computer executable instructions to cause a processor to perform steps described herein or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone—DECT phones, mobile phones, mobile televisions, personal digital assistants (PDA), landline phones 117, which may be Voice over Internet Protocol (VoIP) phones, and any other desired devices. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content.

Figure 2:
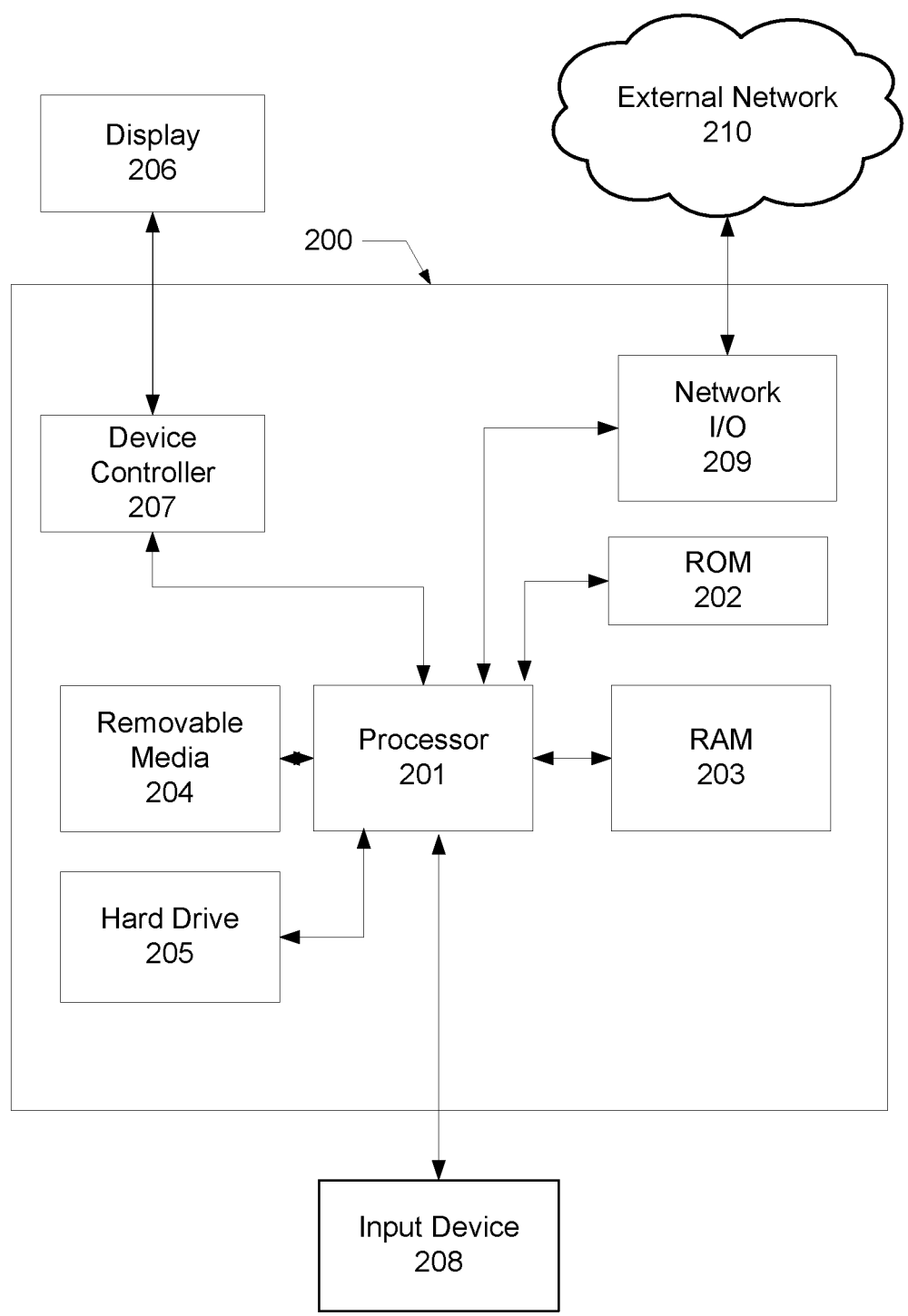
FIG. 2 shows an example computing device that may be used to implement any of the methods described herein.

FIG. 2 shows an example computing device that may be used to implement any of the methods described herein. A computing device 200 may include one or more processors 201, which may execute instructions of a computer program to perform any of the features described herein. The instructions may be stored in any type of computer-readable medium or memory, to configure the operation of the processor 201. For example, instructions may be stored in a read—only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. The storage medium may comprise a plurality of sectors, wherein a size of each sector of the plurality of sectors is approximately a multiple of a substantially fixed fragment size. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, a wireless interface, or a combination of the two. The network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 shows a hardware configuration of the device 200, but it should be understood that some or all of the illustrated components may be implemented as software. Modifications may be made to add, to remove, to combine, or to divide components of the computing device 200 as desired. Additionally, the components illustrated may be implemented using basic computing devices and components, and the same components (e.g., a processor 201, a ROM storage 202, a display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices. Generally, program modules include routines, programs, objects, components, data structures, etc. that perform particular tasks or implement particular abstract data types if executed by a processor in a computer or other data processing device. The computer executable instructions may be stored on one or more computer readable media such as a hard disk, an optical disk, a removable storage media, a solid state memory, a RAM, etc. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although examples are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

Figure 3:
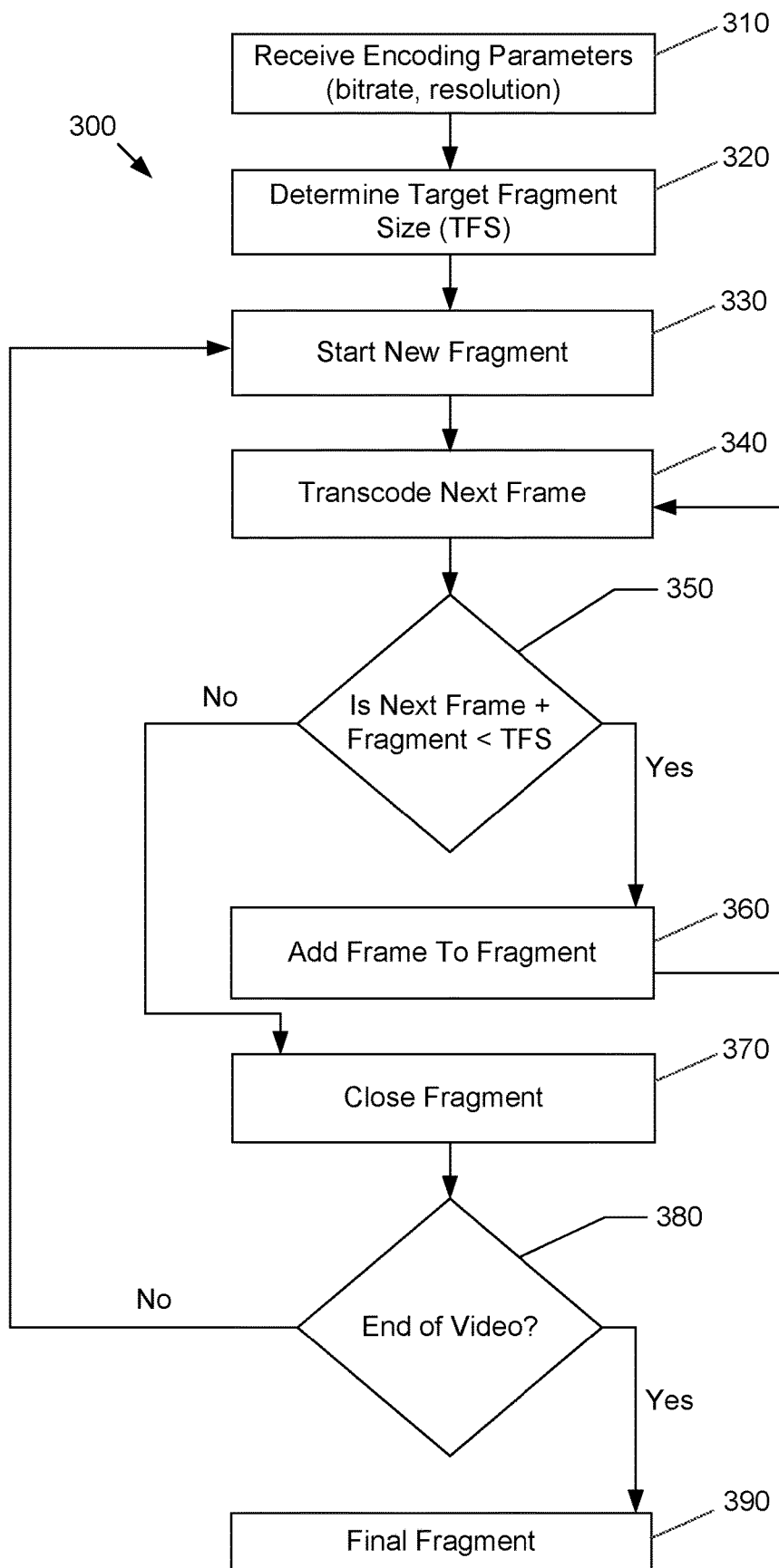
FIG. 3 is a flow diagram of a method for transcoding video content according to aspects of the disclosure.

FIG. 3 is a flow diagram for an example method 300 of transcoding video content according to aspects of the disclosure. The method 300 or one or more steps thereof may be performed by one or more computing devices or entities. Portions of the method 300 may be performed by components of the network 100 or the computing device 200. The method 300 or one or more steps thereof may be embodied in computer-executable instructions that are stored in a computer-readable medium, such as a non-transitory computer readable medium, and may be performed if those instructions are executed by one or more processors. The steps in this flow diagram need not all be performed in the order specified and some steps may be omitted or changed in order.

At step 310, a transcoder may receive encoding parameters for purposes of transcoding an input video. Of the various encoding parameters, the specified bitrate may determine the target fragment size (TFS) in step 320. A High Definition representation out of a transcoder from any given input source video will require more data than a lower resolution representation (e.g., Standard Definition) version within the ABR output set of representations. If each representation is expected to require a smaller or larger amount of data, then the system may choose a smaller or larger target fragment file size, to help ensure that there will be sufficient frames to keep up with playback speed if the fragments are transmitted for processing.

Motion in the video may be another video quality factor that may affect the target fragment size. In motion-based video encoding, such as MPEG (Moving Pictures Experts Group) encoding, it may take more data to encode fast-moving scenes in which many pixels change color from frame to frame, and less data to encode slow-moving scenes in which many pixels stay the same color from frame to frame. Accordingly, if the video is known to contain fast (or slow) moving scenes, then this can also be taken into account in determining the target fragment file size. As noted above, smaller target fragment file sizes may be chosen for video requiring less data, so in the case of motion this would mean that video having more motion (e.g., action movies) may result in a larger target fragment file size. Conversely, video having less motion (e.g., a talk show) may result in smaller frame sizes since the frames are expected to require less space and thusly, smaller target fragment file sizes. Accordingly, the determination of the target fragment file size may be based on the genre of the video content.

In addition to video quality information, a client device may also request a particular fragment file size based on network bandwidth conditions. If a large amount of bandwidth is available, then the client may request a larger target fragment file size, and conversely, if a small amount of bandwidth is available, then the client may request a smaller target fragment file size. If a large amount of bandwidth is available, then a higher bitrate video representation may be requested by the client device because it is more likely that the fragments will be delivered in sufficient time for playback, and doing so may result in reducing the total number of fragment files that a playback device must request (thereby reducing network traffic overhead) due to the variability in playback time that may be encompassed by each fragment.

The target bitrate parameter may be configured based on capabilities of a client device. If the client device that is consuming the content has strong processing capabilities to store larger fragments and process them quickly, then a larger target file size may be used.

Based on these considerations, at step 320, the transcoder may determine a target fragment size (TFS). The transcoder may calculate the TFS as megabits per fragment (Mbpfg), kilobits per fragment (Kbpfg), or bits per fragment (Bpfg). The transcoder may compute the TFS based on the encoding parameters received at step 310 and/or the video quality information. The transcoder may determine that fewer frames will be included in a TFS based on the input video comprising of high definition video content. In another example, the transcoder may determine that more frames will be included in a TFS based on the input video comprising primarily of a talking head with simple motion. For example, the input video may be comprised of a character standing in a single place speaking. This type of input video may result in smaller frame sizes that allow more frames to be included in the fragment. Inversely, an input video where a character is frequently moving around the screen, or where multiple characters are involved may result in larger frame sizes that allow less frames to be included in the fragment. Each frame of video occupies a specific amount of time (in milliseconds) and due to more or less frames being included in a given fragment, each fragment may vary in time but may not vary in size (TFS).

The transcoder may create various output video representations, each with varying target fragment sizes, to accommodate client devices with varying degrees of available bandwidth. For example, a user may request a complex movie, but may have low bandwidth. In this example, the client device may request a video representation from the ABR asset with a small TFS. In doing so, the transcoder provides the user with the appropriate video representation, each representation having varying TFS per representation. As such, the user may be able to watch the complex movie without having to wait, due to the low bandwidth, for large video fragments to load.

The transcoder may compute the TFS based on the target bitrate. The target bitrate may be high, and thus the TFS may also be high. To achieve the targeted TFS, a large number of frames may need to be packed into a fragment. The TFS shall be comprised of a fixed size. These fixed TFS sizes allow for optimized storage per sector on a storage medium. The size of the storage medium sector may be a multiple of the target fragment size. This may allow the storage medium to optimize storage of the fragments that are output. For example, the user may be able to minimize storage on his or her television required to store a requested movie. In addition, this may help to facilitate faster storage and retrieval of video content.

At step 330, the transcoder starts a new fragment. If a frame was excluded from the previous fragment in step 350 and it is not the last frame of the content, then a new fragment may be created to contain that frame. To optimize transmission and storage of video content, for a user, it may be necessary to create near uniform file sizes for video fragments that are to be transmitted to a client device. As a result, if the sum of the frames exceeds the target fragment size, they may be excluded from a fragment, prior to transcoding, and may be held over for inclusion in a subsequent fragment. The transcoder in step 340 shall mark the first of any fragment as an instantaneous decoder refresh frame (IDR) (in the case of AVC or HEVC formats, or equivalent for other formats), and may also mark the same frame with an encoder boundary point (EBP) or equivalent.

At step 340, the transcoder may transcode a frame from the input video for inclusion in the new fragment being assembled. At this step, the transcoder may be aware of how much free space remains in the current fragment and must be aware at which point in the GOP the next frame is located and may use this information in determining what type of frame it will code. The transcoder may be aware of the GOP structure to determine the size of the next frame. For example, if the transcoder cannot transcode the current frame to reside in the current fragment, then it may code the current frame as an instantaneous decoder refresh frame (IDR) (in the case of AVC or HEVC formats, or equivalent for other formats), and may also mark the same frame with an encoder boundary point (EBP) or equivalent.

These features allow the potential video quality gains of variable bitrate (VBR) rate control mode to work in an adaptive bitrate (ABR) streaming solution. With the invention, VBR playout can be supported using predictable fragment sizes that optimize the performance of ABR delivery to the player.

At step 350, the transcoder may determine a size of the new fragment with the latest added frame, and may compare the size to the TFS. For example, the transcoder may determine the size of the new fragment based on a total size of all of the frames comprising the new fragment. In another example, the transcoder may keep a running tab of the size of the new fragment and may dynamically update the running tab as frames are added to the fragment. To determine the size of the new fragment, the transcoder may add a size of an additional frame to the running tab of the size of the new fragment. If the addition of the frame still does not exceed the target frame size, then the process may return to step 340 to add another frame. If the addition exceeds the target frame size, then the process may proceed to step 370. There should always be enough space in the fragment for the first frame. For every subsequent frame, step 350 may provide the transcoder at step 340 with information to determine which picture type (IDR-Frame, I-Frame, B-Frame, P-Frame, etc.) to code the next frame.

At step 360, the transcoder may add a frame to the new fragment. The transcoder may then return to step 340.

At step 370, the transcoder closes the new fragment, but it may pad the new fragment with null packets to reach the TFS before it closes the new fragment. The new fragment may comprise one of a plurality of substantially fixed fragment size fragments of variable time duration. As noted above, having fragments of a uniform size (or under the target fragment file size) may allow for faster storage and retrieval if, for example, the fragments are stored along sector boundaries of a hard drive.

At step 380, the transcoder may determine if there is additional incoming video content comprising additional frames that have not been transcoded. If there are additional frames that have not been transcoded, the method may return to step 330 and create an additional new fragment. If there are not additional frames to be transcoded, the method may proceed to step 390.

At step 390, the final fragment may be transcoded. The final fragment may include an associated remainder of frames. At this step, the user may now have access to the requested movie in its entirety.

Figure 4:
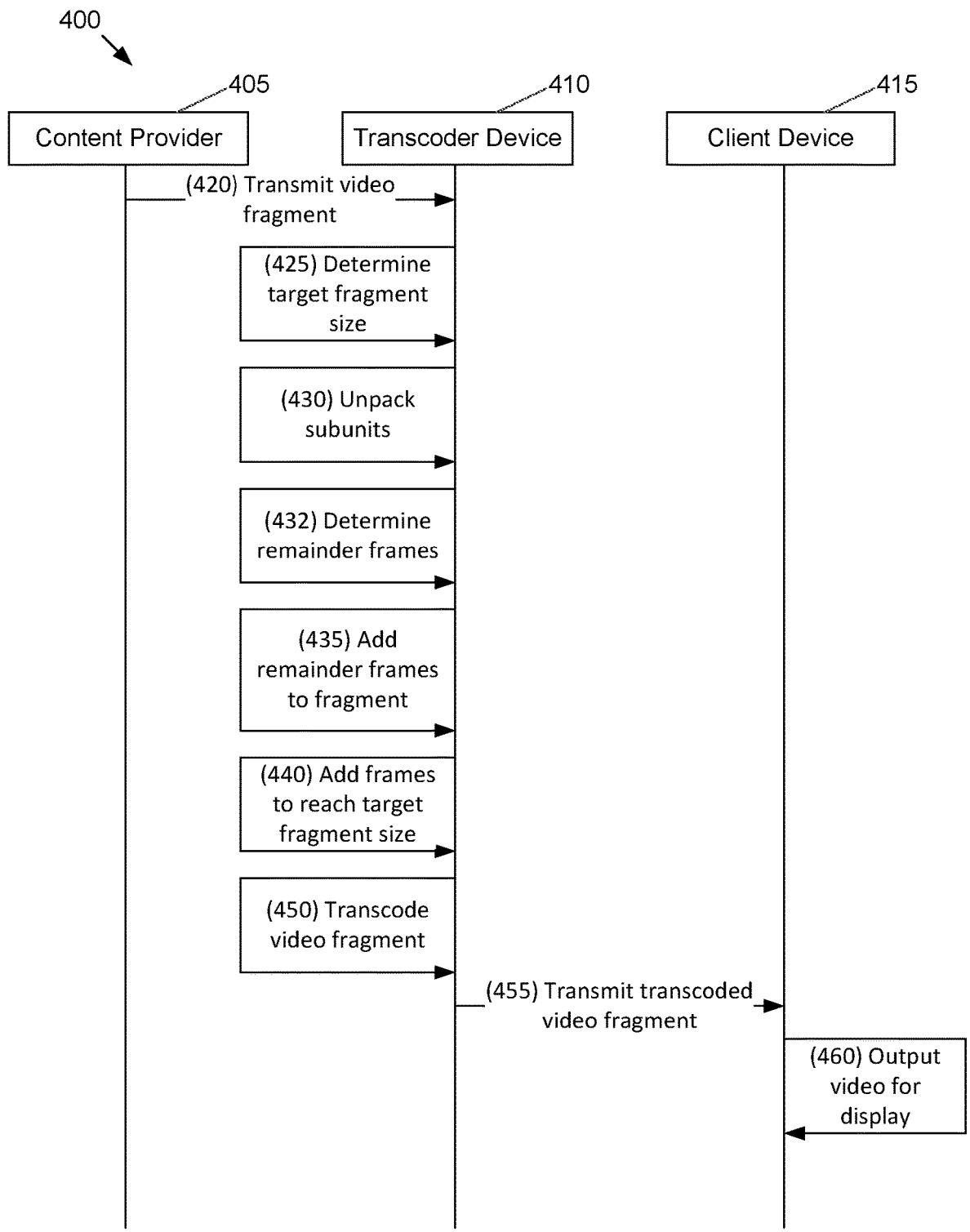
FIG. 4 is a call-flow diagram of a method for transcoding and transmitting video content according to aspects of the disclosure.

FIG. 4 is a call-flow diagram for an example method 400 of transcoding and transmitting video content according to aspects of the disclosure. Examples of devices that may perform the steps are shown in FIG. 4. The devices may be, for example, devices described above with respect to FIG. 3. The method 400 or one or more steps thereof may be performed by one or more computing devices or entities. Portions of the method 400 may be performed by components of the network 100 or the computing device 200. The method 400 or one or more steps thereof may be embodied in computer-executable instructions that are stored in a computer-readable medium, such as a non-transitory computer readable medium, and may be performed if those instructions are executed by one or more processors. The steps in this flow diagram need not all be performed in the order specified and some steps may be omitted or changed in order.

At step 420, a computing device may receive video content. A transcoder device 410 may receive the video content from a content provider 405. The content provider 405 may be part of the external network 109. The video content may comprise a plurality of video fragments. Each of the plurality of video fragments may comprise a plurality of frames. The plurality of video fragments may comprise a plurality of substantially fixed time duration fragments of variable size. Each fragment may contain a same playback duration (e.g., 6 seconds, 180 frames, etc.), but the overall size may vary due to the differences in the amount of data needed to encode the various frames. The plurality of video fragments may comprise digitally encoded video having a first resolution. The plurality of substantially fixed time duration fragments of variable size may comprise a first fragment with a six second duration that comprises 180 frames and 500 kB. Also, the plurality of substantially fixed time duration fragments of variable size may comprise a second fragment with a six second duration that comprises 180 frames and 420 kB. Further, the plurality of substantially fixed time duration fragments of variable size may comprise a third fragment with a six second duration that comprises 180 frames and 200 kB. The plurality of video fragments may be formatted in accordance with an MPEG standard. Thus, input video may comprise a plurality of substantially fixed time duration fragments.

At step 425, the transcoder device 410 may determine a target fragment size. As described above with regards to step 320, the transcoder device 410 may determine the target fragment size based on video quality associated with the video content received in step 420. The transcoder device 410 may base the target fragment size on a resolution and/or a bitrate of output video associated with the video content received in step 420. The number of frames included in a fragment may vary based on the amount of motion in the underlying video. In general, if the frames need larger amounts of data to be encoded (e.g., due to higher resolution, high amounts of motion, etc.), then the system may determine fewer frames will fit into the fragment, yet still reach target fragment size. This is described further above with regards to step 320.

At step 430, the transcoder device 410 may unpack subunits from the video fragment. Unpacking the subunits from the video fragment may comprise unpacking frames from a packetized elementary stream into an elementary stream. This unpacking may entail decoding the video fragment to recover the original video frames of the underlying video.

At step 432, the transcoder device may determine a remainder of frames from a previously-processed video content. The previously-processed video content may comprise a previously-processed fragment. During assembly of a new version of a previous fragment (e.g., a fragment whose frames immediately precede those of the current incoming fragment), the transcoder may have determined that some of the frames from that previous incoming fragment would not fit in the new fragment, and those remainder/holdover frames may now be added to the beginning of the next fragment.

At step 435, the transcoder may add the remainder of frames to a new fragment.

At step 440, additional frames from the current incoming fragment file may be added to the new fragment. As described above with respect to steps 340 to 370, the transcoder device 410 may continue to add frames to the new fragment until the target fragment size is reached (or until a next frame would cause the fragment to exceed the target fragment size). The transcoder device 410 may determine that the next frame would cause the size of the new fragment to exceed the target fragment size. The transcoder device 410 may deselect that next frame from the frames that were selected for the new fragment being assembled. This deselected additional frame, and subsequent frames in the incoming fragment, may comprise the remainder of frames if another incoming fragment is transcoded. For example, a fifth frame may comprise the remainder of frames where adding the fifth frame would cause a size of the new fragment to exceed the TFS.

The transcoder device 410 may add one or more padding bits, such as null bits, to the new fragment before the new fragment is closed. The transcoder device 410 may add padding bits to the new fragment so that the total size of the fragment is equal to the target fragment size. For example, if the transcoder device 410 determines that the total fragment size is less than the target fragment size, the transcoder device 410 may add a plurality of null packets to the fragment so that the total fragment size equals the target fragment size.

The transcoder device may permit fragment sizes to exceed the target fragment size by a predetermined threshold. If a total size of the new fragment is greater than the target fragment size but less than the predetermined threshold, the transcoder device 410 might not remove the additional frame.

At step 450, the transcoder may transcode a portion of the video content, not yet transcoded, into a plurality of video fragments comprising a substantially fixed fragment size of variable duration. The transcoder device may repeat steps 330-380 until all of the video content is transcoded, resulting in transcoded video content. The transcoder may repeatedly create video fragments based on new incoming fragments and remainders of frames until all of the video content is transcoded. The video fragments may comprise substantially fixed fragment size fragments of variable duration. The substantially fixed fragment size may simply refer to the fact that the overall fragment sizes are set to fall within, or not exceed, a target fragment size, although padding bits may be used to cause the fragments to have the same precise file size.

At step 455, the transcoder device 410 may transmit the transcoded video content. The transcoder device 410 may transmit the transcoded video content to a storage medium. The storage medium may comprise a plurality of sectors, and each of the plurality of sectors may be an approximate multiple of the substantially fixed fragment size. The transcoder device 410 may transmit the transcoded video content to a client device 415.

The transcoded video content may comprise a stream of substantially fixed fragment size fragments of variable time duration. The stream may comprise a first 500 kB fragment with a two second duration and comprising sixty frames. The stream may also comprise a second 500 kB fragment with a three second duration and comprising ninety frames. Further, the stream may also comprise a third 500 kB fragment with a 3.5 second duration and comprising 105 frames. The transcoder device 410 may transmit the transcoded video content via an internet protocol (IP) stream. The transcoder 410 may transmit the transcoded video content via a quadrature amplitude modulation (QAM) channel transmission stream. The transcoder may transmit the transcoded video content prior to all of the video content being transmitted.

At step 460, the client device 415 may output the transcoded video content for display. The client device 415 may remove, prior to outputting the transcoded video content for display, each of the subunits from each of the plurality of video fragments comprising a substantially fixed fragment size of variable duration. The client device 415 may output the transcoded video content for display. The output video may have a same video quality as the video content received in step 420. The output video may have a same resolution and/or frame rate as the video content received in step 420.

Figure 5:
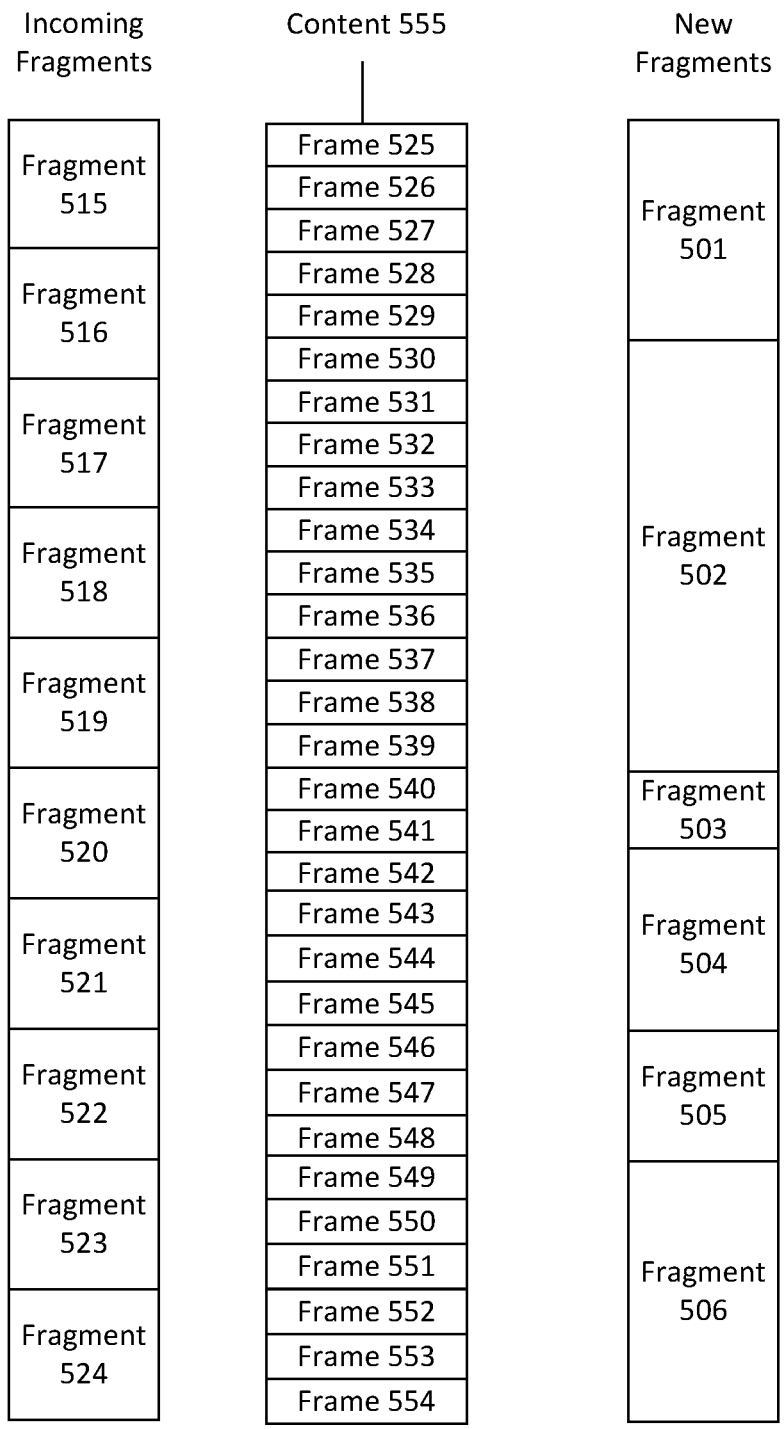
FIG. 5 shows examples of frames according to aspects of the disclosure.

FIG. 5 shows examples of frames according to aspects of the disclosure. The examples of frames show the various frames of a piece of video content, and how those frames may be grouped into incoming fragments (having a fixed playback duration but variable overall file size) and into new fragments (having a fixed or capped overall file size but variable playback duration). A client device may request content 555, which may comprise frames 525-554. The content 555 may comprise a plurality of substantially fixed time duration fragments of variable size, such as fragments 515-524. Fragments 515-524 may have been generated via a method other than the method 300. As shown in FIG. 5, the content 555 may comprise ten video fragments 515-524, totaling video content with a sixty second duration. Each video fragment 515-524 comprises six seconds of video. As a result, the client device may transmit ten requests for the content 555, where each of the requests comprises a request for one of the video fragments 515-524.

After these incoming frames are processed, the content 555 may then comprise new fragments of substantially fixed size and of variable time duration, such as fragments 501-506. As a result, in contrast to fragments 515-524, fragments 501-506 show a 40% reduction in network requests by switching from substantially fixed time duration fragments of variable size to fragments of substantially fixed size and of variable time duration because in this chosen example, the new fragments were permitted to contain more than just the standard six seconds of video contained in the original incoming fragments.

Figure 6:
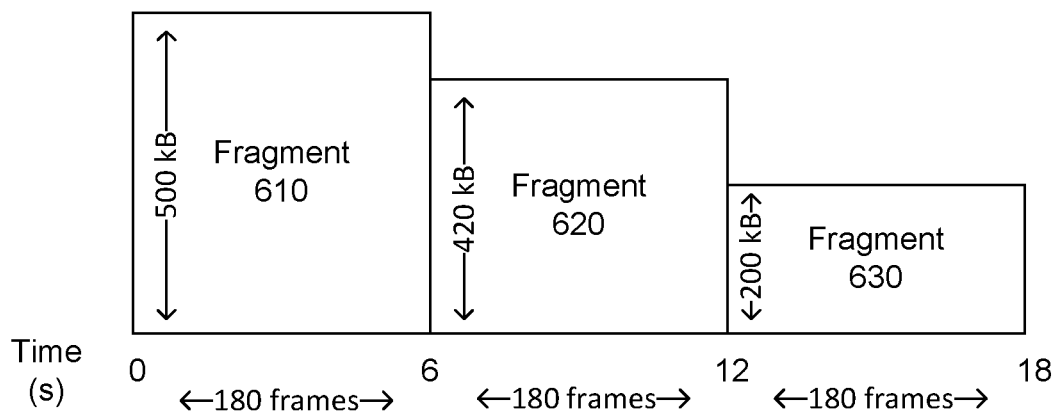
FIG. 6 shows the original incoming fragments according to aspects of the disclosure.

FIG. 6 shows the original incoming fragments according to aspects of the disclosure. In FIG. 6, a video stream may contain the sequential fragments shown, and the fragments may have a substantially fixed time duration (e.g., six seconds), but the sizes may vary substantially. The video stream may comprise a VBR video stream. The VBR video stream may comprise a VBR video elementary output stream. The video stream may comprise an average bitrate video stream. The substantially fixed time duration fragments of variable size may each have a fixed playback duration of six seconds/180 frames. A video stream may comprise a first fragment 610 with a duration of six seconds and that comprises 180 frames and 500 kB. Also, the video stream may comprise a second fragment 620 with a duration of six seconds and that comprises 180 frames and 420 kB. Further, the video stream fragments of variable size may comprise a third fragment 630 with a duration of six seconds and that comprises 180 frames and 200 kB. The fragments 610-630 may have a predetermined time duration.

Figure 7:
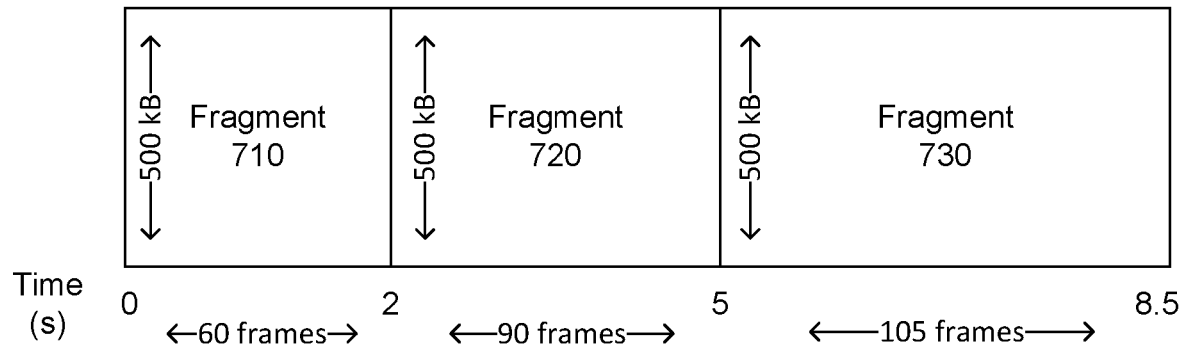
FIG. 7 shows a video stream comprising substantially fixed fragment size fragments of variable time duration according to aspects of the disclosure.

FIG. 7 shows a video stream comprising substantially fixed fragment size fragments of variable time duration according to aspects of the disclosure. The video stream may comprise a VBR video stream. FIG. 7 shows the result of a transcoder transcoding, using the method 300, the video content. The video stream may comprise fragments that have variable playback duration (e.g., 60 frames, 90 frames, 105 frames) but a fixed overall file size (e.g., 500 kB). For example, the video stream may comprise a first 500 kB fragment 710 with a two second duration that comprises sixty frames. The video stream may also comprise a second 500 kB fragment 720 with a three second duration that comprises ninety frames. Further, the video stream may also comprise a third 500 kB fragment 730 with a 3.5 second duration that comprises 105 frames. A transcoder may close the fragment 710, and may determine that the end of the video has been reached. This action may be similar to that described above in regards to step 380.

Figure 8:
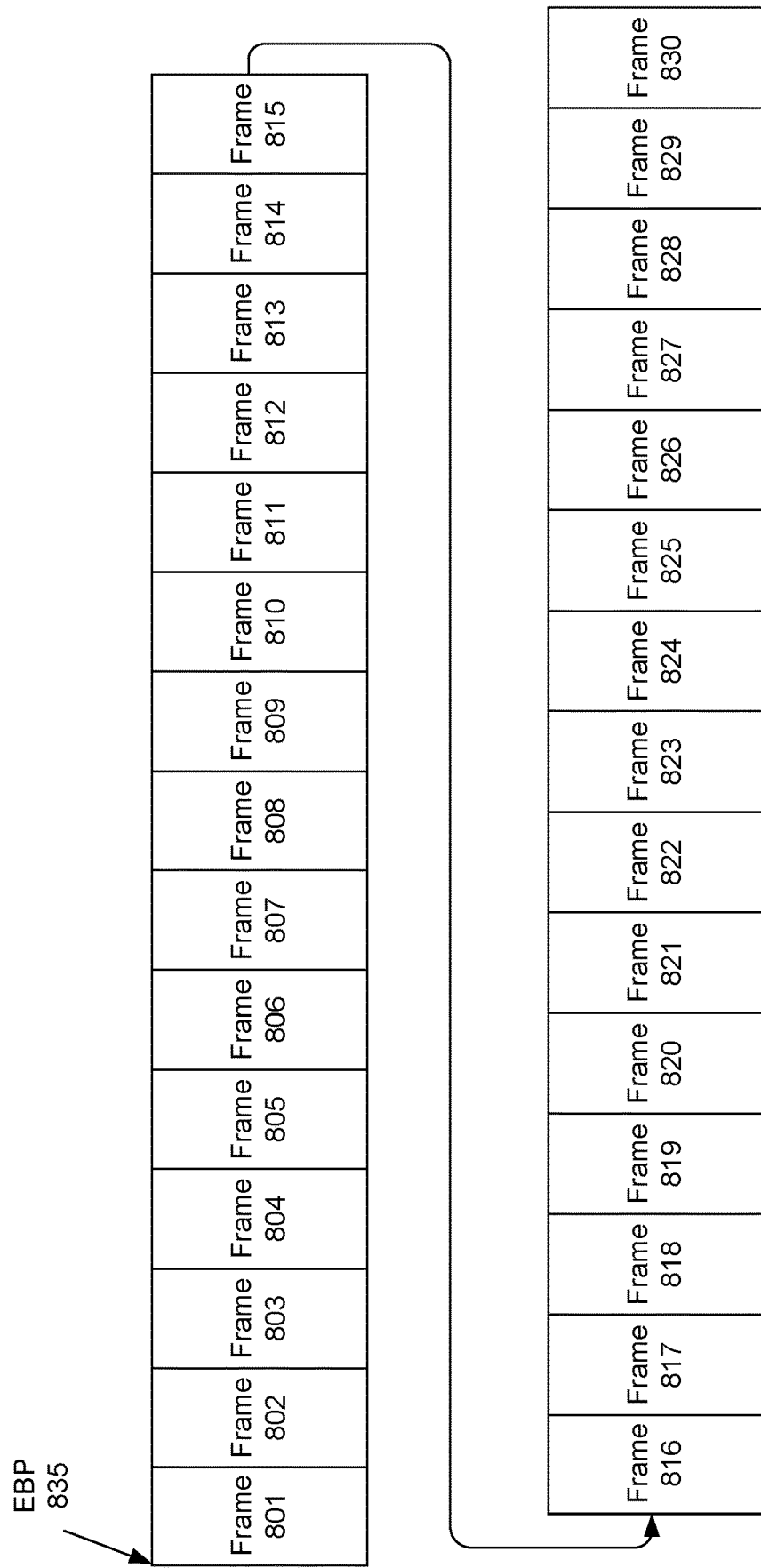
FIG. 8 shows a plurality of frames with a fixed group of pictures (GOP) according to aspects of the disclosure.

FIG. 8 shows a fragment having a plurality of frames with a fixed group of pictures (GOP) playback duration according to aspects of the disclosure. FIG. 8 shows a video fragment transcoded using a method other than the method 300. The fragment comprising the VBR video stream may comprise a fixed time duration and a fixed amount of frames (e.g., the 30 frames shown in FIG. 8), but the overall file size may vary between fragments. Each of the substantially fixed time duration fragments of variable size may comprise the plurality of frames 801-830. Further, a transcoder may mark frame 801 with, for example, an EBP 835. Thus, each of the substantially fixed time duration fragments of variable size may comprise thirty frames. A user may define a duration of the substantially fixed time duration fragments. For example, the user may set the duration to thirty frames/one second. This plurality of frames may comprise, for example, one of the fragments 610-630 as described above. By keeping the time duration of each fragment fixed, and keeping the size of each fragment variable, the fragments shown in FIG. 8 may contrast with the method described above, in regards to FIG. 3, for dynamically closing a fragment based on a target file size.

Figure 9:
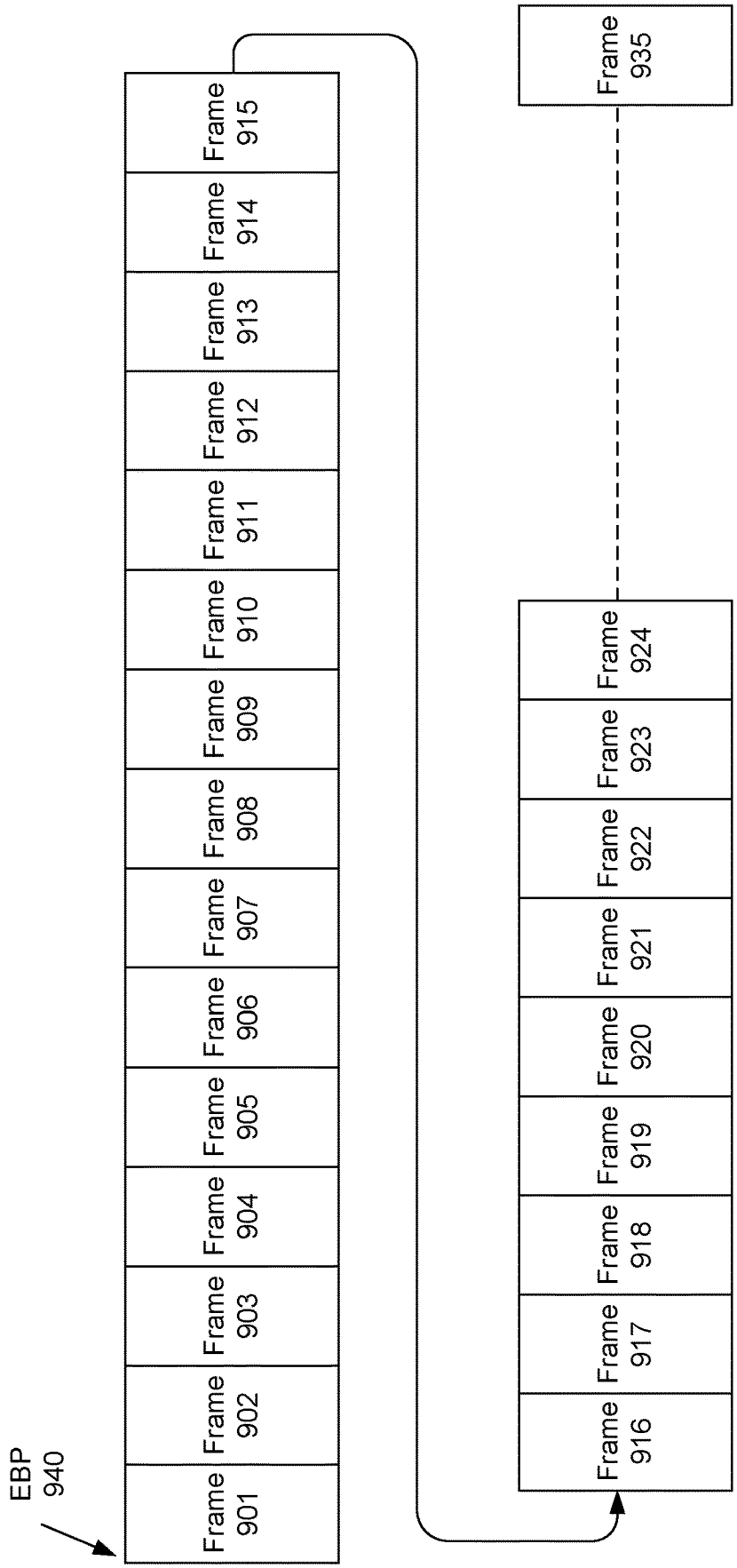
FIG. 9 shows a plurality of frames with a variable GOP according to aspects of the disclosure.

FIG. 9 shows a plurality of frames with a variable GOP according to aspects of the disclosure. FIG. 9 shows a video fragment transcoded using the method 300. The variable GOP shown in FIG. 9 allows for creation of a plurality of fragments that are uniform in overall file size, but that may have varied time durations and may comprise varied amounts of frames. One of the fragments that are uniform in size may comprise a plurality of frames 901-935. A transcoder may mark frame 901 with, for example, an EBP 935. A user may define a size of the fragments that are uniform in size. For example, the user may set the size of the fragments to be 500 kB. This plurality of frames may comprise, for example, one of the fragments 710-730 as described above. By keeping the size of each fragment fixed and keeping the time variable, the fragments, such as is shown in FIG. 9, may not always comprise the same amount of frames. The FIG. 9 fragment may comprise thirty-five frames. The FIG. 9 fragment may comprise thirty one frames. The amount of frames included in the FIG. 9 fragment may depend on the size of each frame included in the FIG. 9 fragment.

Although examples are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   receiving sequential first and second video fragments of video content, wherein the first and second video fragments are of different file sizes and are of a same playback duration;
   determining, based on video characteristics of the video content, a target fragment size;
   determining, based on the target fragment size, and based on a size of the first video fragment and a size of the second video fragment, a third video fragment comprising:
      a portion of the first video fragment, and
      a first portion of the second video fragment; and
   sending the third video fragment as a portion of a stream of fragments, wherein fragments of the stream of fragments are of a same file size and are of different playback durations.

2. The method of claim 1, wherein the sending the third video fragment comprises sending a plurality of video fragments that comprise different quantities of frames and that have file sizes that satisfy the target fragment size.

3. The method of claim 1, wherein the video characteristics of the video content comprise one or more of:
   a resolution of the video content;
   a genre of the video content; or
   one or more encoding parameters associated with the video content.

4. The method of claim 1, further comprising:
   determining, based on the target fragment size, and based on the size of the second video fragment, a fourth video fragment comprising a second portion of the second video fragment, wherein the sending the third video fragment comprises sending the fourth video fragment.

5. The method of claim 1, wherein the determining the target fragment size is further based on network bandwidth conditions.

6. The method of claim 1, wherein the determining the target fragment size is further based on a size of a storage medium.

7. The method of claim 1, wherein the sending the third video fragment comprises sending the third video fragment via an internet protocol (IP) stream, and wherein a maximum packet size of the IP stream is approximately a multiple of the target fragment size.

8. An apparatus comprising:
   one or more processors; and
   memory storing instructions that, when executed by the one or more processors, cause the apparatus to:
      receive sequential first and second video fragments of video content, wherein the first and second video fragments are of different file sizes and are of a same playback duration;
      determine, based on video characteristics of the video content, a target fragment size;
      determine, based on the target fragment size, and based on a size of the first video fragment and a size of the second video fragment, a third video fragment comprising:
         a portion of the first video fragment, and
         a first portion of the second video fragment; and
      send the third video fragment as a portion of a stream of fragments, wherein fragments of the stream of fragments are of a same file size and are of different playback durations.

9. The apparatus of claim 8, wherein the instructions, when executed by the one or more processors, cause the apparatus to send the third video fragment by causing the apparatus to send a plurality of video fragments that comprise different quantities of frames and that have file sizes that satisfy the target fragment size.

10. The apparatus of claim 8, wherein the video characteristics of the video content comprise one or more of:
    a resolution of the video content;
    a genre of the video content; or
    one or more encoding parameters associated with the video content.

11. The apparatus of claim 8, wherein the instructions, when executed by the one or more processors, further cause the apparatus to:
    determine, based on the target fragment size, and based on the size of the second video fragment, a fourth video fragment comprising a second portion of the second video fragment, wherein the instructions, when executed by the one or more processors, cause the apparatus to send the third video fragment by causing the apparatus to send the fourth video fragment.

12. The apparatus of claim 8, wherein the instructions, when executed by the one or more processors, cause the apparatus to determine the target fragment size further based on network bandwidth conditions.

13. The apparatus of claim 8, wherein the instructions, when executed by the one or more processors, cause the apparatus to determine the target fragment size further based on a size of a storage medium.

14. The apparatus of claim 8, wherein the instructions, when executed by the one or more processors, cause the apparatus to send the third video fragment by causing the apparatus to send the third video fragment via an internet protocol (IP) stream, and wherein a maximum packet size of the IP stream is approximately a multiple of the target fragment size.

15. A non-transitory computer-readable medium storing instructions that, when executed, cause:
    receiving sequential first and second video fragments of video content, wherein the first and second video fragments are of different file sizes and are of a same playback duration;
    determining, based on video characteristics of the video content, a target fragment size;
    determining, based on the target fragment size, and based on a size of the first video fragment and a size of the second video fragment, a third video fragment comprising:
       a portion of the first video fragment, and
       a first portion of the second video fragment; and
    sending the third video fragment as portion of a stream of fragments, wherein fragments of the stream of fragments are of a same file size and are of different playback durations.

16. The computer-readable medium of claim 15, wherein the instructions, when executed, cause sending the third video fragment by causing sending of a plurality of video fragments that comprise different quantities of frames and that have file sizes that satisfy the target fragment size.

17. The computer-readable medium of claim 15, wherein the video characteristics of the video content comprise one or more of:
  a resolution of the video content;
  a genre of the video content; or
  one or more encoding parameters associated with the video content.

18. The computer-readable medium of claim 15, wherein the instructions, when executed, further cause:
  determining, based on the target fragment size, and based on the size of the second video fragment, a fourth video fragment comprising a second portion of the second video fragment, wherein the instructions, when executed, cause the sending the third video fragment by causing sending the fourth video fragment.

19. The computer-readable medium of claim 15, wherein the instructions, when executed, cause the determining the target fragment size further based on network bandwidth conditions.

20. The computer-readable medium of claim 15, wherein the instructions, when executed, cause the determining the target fragment size further based on a size of a storage medium.

21. A system comprising:
  a first apparatus; and
  a second apparatus,
  wherein the first apparatus comprises:
    one or more first processors; and
    first memory storing first instructions that, when executed by the one or more first processors, cause the first apparatus to:
      receive sequential first and second video fragments of video content, wherein the first and second video fragments are of different file sizes and are of a same playback duration;
      determine, based on video characteristics of the video content, a target fragment size;
      determine, based on the target fragment size, and based on a size of the first video fragment and a size of the second video fragment, a third video fragment comprising:
        a portion of the first video fragment, and
        a first portion of the second video fragment; and
      send the third video fragment as a portion of a stream of fragments, wherein fragments of the stream of fragments are of a same file size and are of different playback durations; and
  wherein the second apparatus comprises:
    one or more second processors; and
    second memory storing second instructions that, when executed by the one or more second processors, cause the second apparatus to:
      receive the stream of fragments.

22. The system of claim 21, wherein the first instructions, when executed by the one or more first processors, cause the first apparatus to send the third video fragment by causing the first apparatus to send a plurality of video fragments that comprise different quantities of frames and that have file sizes that satisfy the target fragment size.

23. The system of claim 21, wherein the video characteristics of the video content comprise one or more of:
  a resolution of the video content;
  a genre of the video content; or
  one or more encoding parameters associated with the video content.

24. The system of claim 21, wherein the first instructions, when executed by the one or more first processors, further cause the first apparatus to:
  determine, based on the target fragment size, and based on the size of the second video fragment, a fourth video fragment comprising a second portion of the second video fragment, wherein the first instructions, when executed by the one or more first processors, cause the first apparatus to send the third video fragment by causing the first apparatus to send the fourth video fragment.

25. The system of claim 21, wherein the first instructions, when executed by the one or more first processors, cause the first apparatus to determine the target fragment size further based on network bandwidth conditions.

26. The system of claim 21, wherein the first instructions, when executed by the one or more first processors, cause the first apparatus to determine the target fragment size further based on a size of a storage medium.

27. The system of claim 21, wherein the first instructions, when executed by the one or more first processors, cause the first apparatus to send the third video fragment by causing the first apparatus to send the third video fragment via an internet protocol (IP) stream, and wherein a maximum packet size of the IP stream is approximately a multiple of the target fragment size.

* * * * *

UNITED STATES PATENT AND TRADEMARK OFFICE
CERTIFICATE OF CORRECTION

PATENT NO. : 11,743,535 B2
APPLICATION NO. : 17/869290
DATED : August 29, 2023
INVENTOR(S) : Pikus et al.

It is certified that error appears in the above-identified patent and that said Letters Patent is hereby corrected as shown below:

In the Claims

Column 14, Claim 15, Line 64:
After "As", insert --a--

Signed and Sealed this
Fifteenth Day of October, 2024

Katherine Kelly Vidal
*Director of the United States Patent and Trademark Office*